US008258923B2

United States Patent
Schulman et al.

(10) Patent No.: US 8,258,923 B2
(45) Date of Patent: Sep. 4, 2012

(54) SYSTEM AND METHOD FOR LOCATING OBJECTS AND COMMUNICATING WITH THE SAME

(75) Inventors: Joseph H. Schulman, Santa Clarita, CA (US); Lawrence J. Karr, Santa Monica, CA (US)

(73) Assignee: Alfred E. Mann Foundation for Scientific Research, Santa Clarita, CA (US)

( * ) Notice: Subject to any disclaimer, the term of this patent is extended or adjusted under 35 U.S.C. 154(b) by 1342 days.

(21) Appl. No.: 11/885,844

(22) PCT Filed: Dec. 20, 2005

(86) PCT No.: PCT/US2005/046185
§ 371 (c)(1),
(2), (4) Date: Sep. 6, 2007

(87) PCT Pub. No.: WO2006/098790
PCT Pub. Date: Sep. 21, 2006

(65) Prior Publication Data
US 2008/0169904 A1 Jul. 17, 2008

Related U.S. Application Data

(60) Provisional application No. 60/661,771, filed on Mar. 14, 2005.

(51) Int. Cl.
*G08B 5/22* (2006.01)
*G08B 25/00* (2006.01)
*H04Q 1/30* (2006.01)

(52) U.S. Cl. ...... 340/8.1; 340/7.22; 340/7.21; 340/10.1; 340/10.4

(58) Field of Classification Search ............ 340/8.1, 340/7.22, 7.21, 10.1, 10.4; 342/70, 118; 235/384
See application file for complete search history.

(56) References Cited

U.S. PATENT DOCUMENTS

| | | |
|---|---|---|
| 3,049,709 A | 8/1962 | Rianhard |
| 5,418,537 A | 5/1995 | Bird |
| 5,576,716 A | 11/1996 | Sadler |
| 5,959,568 A | 9/1999 | Woolley |
| 6,141,293 A | 10/2000 | Amorai-Moriya |
| 6,150,921 A | 11/2000 | Werb |
| 6,198,390 B1 * | 3/2001 | Schlager et al. ............. 340/540 |
| 6,317,049 B1 | 11/2001 | Toubia |
| 6,473,028 B1 * | 10/2002 | Luc ............................. 342/118 |
| 6,614,387 B1 * | 9/2003 | Deadman ....................... 342/70 |
| 6,774,764 B2 * | 8/2004 | Ghosh et al. ................ 340/5.61 |
| 6,803,851 B1 * | 10/2004 | Kramer et al. .............. 340/5.61 |
| 2005/0228659 A1 | 10/2005 | Mitlin |
| 2006/0038676 A1 | 2/2006 | Richards |

* cited by examiner

*Primary Examiner* — Nam V Nguyen
(74) *Attorney, Agent, or Firm* — Malcolm J. Romano

(57) ABSTRACT

An object locator system utilizes a microtransponder (12) that is used in association with an object to be located. A remote locator (10) transmits an encoded signal in which is embedded an identification code associated with the object to be located. The microtransponder (12) receives the encoded transmitted signal and processes such signal utilizing fast fourier transform techniques. The microtransponder (12) correlates the transformed received signal with a fast fourier transformed version of an identification code associated with the microtransponder (12) and upon detection of a correlation, transmits an acknowledgement signal to the remote locator (10). The remote locator (10) determines the distance to the microtransponder (12) based upon the round trip time from transmission of the coded signal to the microtransponder (12) to the receipt of the acknowledgement signal.

63 Claims, 9 Drawing Sheets

SYSTEM AND METHOD FOR LOCATING OBJECTS AND COMMUNICATING WITH THE SAME

CROSS REFERENCE TO RELATED APPLICATIONS

The present application claims the benefit under 35 U.S.C. 119(e), of Provisional Application Ser. No. 60/661,771, entitled "System and Method for Locating Objects and Communicating the Same", filed Mar. 14, 2005.

FIELD OF THE INVENTION

This invention generally relates to system and method for locating objects, and more specifically, relates to locating a living being and communicating with the same.

BACKGROUND OF THE INVENTION

Apparatus and methods for locating an object are known in the art. A missing vehicle locator is described in U.S. Pat. No. 5,418,736 issued to Bird which describes using one or more GPS systems in conjunction with a GPS antenna, a receiver/transmitter, a telephone with associated antennas, and a modem mounted in a vehicle whose position is to be monitored. At such time that the vehicle location is to be determined, a paging request is issued and received by a paging responder within the vehicle. The paging request causes the modem to interrogate the GPS receiver to determine the current position of the vehicle, which is then transmitted via the cellular phone link to notify a vehicle location service center of the current location of the vehicle. Other location determining techniques may use a Loran or a Glonass satellite system.

Another object location system is descried in U.S. Pat. No. 5,576,716 to Sadler for locating lost or stolen property that includes a GPS module, microcomputer, modem and a phone, all of which being installed in the vehicle. The system described regularly and automatically computes the position of the property for transmission via a phone link to a central receiver/transmission station.

It is recognized that signal transmission from relatively "low power" transmitting sources are subject to signal corruption due to noise and static. Extracting an information signal containing noise, wherein the information signal is of the same order of magnitude or even smaller than the noise signal, presents a major hurdle to overcome when attempting to extract the information signal from the noise. In this regard, the present invention provides a new and novel signal extraction technique that accommodates the use of a relatively small, low power and undetectable microtransponder in an object location system.

SUMMARY OF THE INVENTION

The present disclosure relates to a system, apparatus and method for locating an object, and more particularly, a living being. A remote locator (RL) is arranged to communicate with a transponder or micro-transponder (MT) for determining the location of the MT. The transponder device may be a wearable device, implanted in a living being, attached to an object, or embedded in some object.

Briefly stated, communication between a RL and a MT is used to determine the relative position between the RL and the MT. The RL and the MT each include a transmitter and a receiver. The RL emits a relatively powerful signal with a repeating sequence. Periodically, the MT correlates an internally stored ID code against incoming signals and/or noise, which may or may not include the ID code associated with a target MT. Upon a match, the MT emits a response or acknowledgement signal coherent with the received signal. The RL processes the acknowledgement signal received from the MT, determines round-trip time-of-flight, and computes the distance to the MT.

The RL may be arranged to initiate a transmission sequence that includes transmission signals that are encoded with a unique identifier that is associated with the MT. The MT can be arranged to operate in a sleep mode to conserve power. Periodically, the MT is activated out of the sleep mode to capture signals that can be noise and/or signals from the RL. A variety of signal processing functions are performed on the captured signals to validate that the transmission has been received by the intended MT. Data is extracted from the captured signals, and in the event the captured signal includes the ID code, a reply message is transmitted from the MT back to the RL, where similar signal processing functions are performed. The carefully corrected round-trip time of the transmission sequence is used to identify distance between the RL and the MT.

The presently described system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The received transmission signal is processed to provide a digital output and further processing provides a Fast Fourier Transform (FFT) of the digital output. A reference FFT or an FFT of an ID code associated with a target MT is provided by the MT. The MT correlates each piece of its received structured signals to determine if these signals are coded with an identification code (ID Code) that is specifically associated with the MT.

The correlation process involves the complex conjugate multiplication of the FFT of the digital output of the processed received transmission signal and a reference FFT or an FFT of an ID code associated with a target MT. An inverse FFT of the complex conjugate product provides a correlation output in the form of a "spike" or a large pulsatile signal relative to other pulsatile signals within the inverse FFT, when a match between the received coded signal and the ID code associated with the MT occurs. The reply transmission that is transmitted from the MT to the RL is a very low power transmission of short duration (a short structured signal) such that significant battery life is conserved. The reply transmission (acknowledge signal) received by the RL is processed in a manner consistent with the correlation technique used in by the MT to confirm that the target MT has responded.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
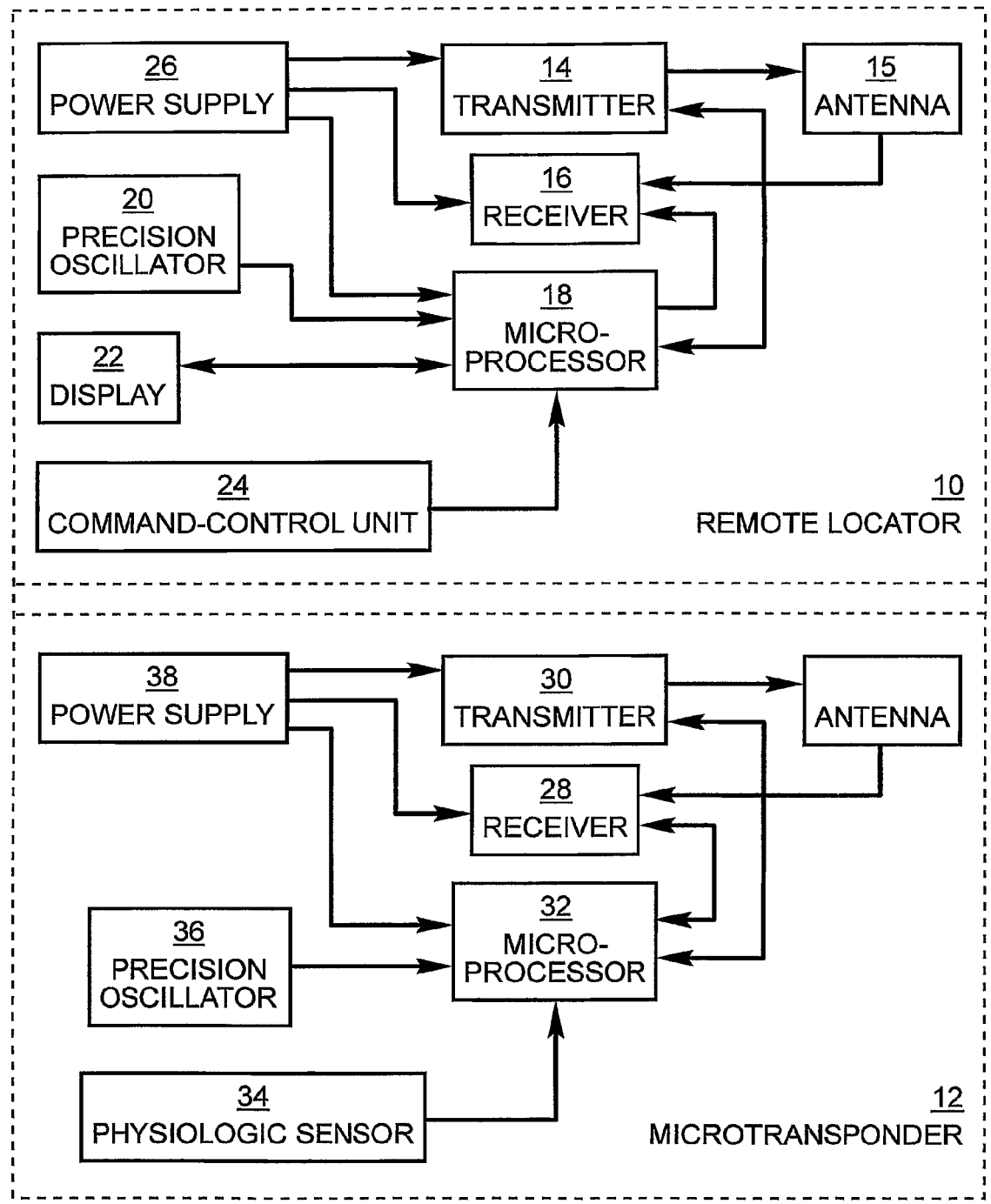
FIG. 1 is a block diagram of an object locator system of the present invention.

This invention relates to the use of a microtransponder coupled to an object such as a human being, for locating the object by a number of location determining techniques including using a Global Positioning Satellite, triangulation techniques and the use of a directional antenna. An example microtransponder, which is in radio communication with an object locator remote (locator) preferably has a lateral dimension of no greater than about 7 mm and a longitudinal dimension of no greater than about 70 mm. As an example, the microtransponder may be cylindrical in shape with a diameter of 7 mm and an axial dimension of 70 mm. In another example, the microtransponder has a volume of about 2700 cubic millimeters. The communication range between the microtransponder and remote locator is in the range of about 100 feet to 400 miles.

Instances occur when the location of objects is required to be determined quickly and accurately. The objects to be located range from inanimate to animate and include, on the one hand, automobiles, trucks, and bicycles, for example, to people and animals on the other hand. The inanimate objects to be located may be the subject of a theft, being lost in transit, or otherwise removed from a known location. More perplexing and perhaps more critical is the location of people or animals who are either sick or lost, or have been taken without authorization. Diabetics, for example, may experience episodes of incapacity due to failure to administer remedial medication. Quick location of such individuals is imperative in order to prevent the individual from suffering negative long-term physical effects or even death resulting from the failure to administer the medication. Similarly, individuals suffering from memory disorders may wander off or lose their way, in which case, immediate retrieval is required. On a similar note, the object locating capability of the present invention can be used to locate kidnap victims or those successfully escaping confinement such as prison inmates and mental patients.

Another instance where, for example, location of children is very desirable occurs when children are separated from their guardians in major traffic areas, such as shopping malls, amusement parks, the beach, and the like. In these and similar circumstances, the potential of speedy location of lost children maintains a high reassuring safety factor to the parents or guardian.

The present invention provides a system comprising at least one remote locator unit for locating and communicating information with at least one microtransponder or microtransceiver. The example system of the present invention enables one to locate an object which may include a person or other living being or an item. The microtransponder (MT) is elegantly manufactured such that it is of a size and dimension that accommodates implanting the device into the body of a person in order to conceal its existence from others or it can be attached to any other object where the MT is intended to be inconspicuous.

FIG. 1 illustrates a schematic representation of an object locator in accordance with the present invention. Although applicable for a wide variety of applications, it is anticipated that particular utility is found in the location and tracking of humans. Accordingly, for an example system, a MT is used in association with a person whose location is desired to be determined. The person may wear or carry or may even have the MT implanted in a manner so as to enable the MT to communicate with the remote locator. The remote locator can transmit an encoded signal of relatively high power covering a predetermined distance or range. The encoded signal may include at least an identification code that is associated with a unique one of a plurality of MT's. For example, the remote locator may be placed in an aircraft which is in flight over an area where the person is suspected to be present. When the remote locator is within range with the person implanted with the MT, communication with a MT having the desired identification code may be undertaken. Upon receiving the encoded signal, the MT processes and decodes the signal in order to verify the identification code. In the event that the identification code matches the identification code associated with a unique MT, then the MT automatically generates a response in the form of an acknowledgement signal a preselected time thereafter. The acknowledgement signal is transmitted to the remote locator indicating the proper identification of the targeted MT. The object locator system is capable of measuring the time elapsed from the transmission of the coded signal and receipt of the acknowledgement signal from the targeted MT and thereby very precisely determine (measure) the distance between the remote locator and the MT. Subsequent, preferably relatively close in time distance measurements at different remote locator positions may be used to determine direction as well as distance of the MT relative to the remote locator. The present invention provides for a novel signal correlation method of extracting an information signal from noise signals wherein the information signal is below the noise level and generally undetectable to an eavesdropper.

An example embodiment of the present invention used to locate an object is shown in FIG. 1. Broadly, a remote locator (RL) 10 is adapted for communication, in the form of radio wave or wireless communication, with MT 12 which is used in association with an object to be located. The MT may be secured to the object utilizing several conventional techniques and for a specific animate application, the MT may be implanted below the skin of a human or animal.

Broadly, RL 10 comprises a transmitter 14 capable of transmitting a plurality of coded signals, at least one of which is recognizable by MT12 as a unique identification code for such MT, a receiver 16 adapted to receive a coded acknowledgement signal transmitted by MT12 in response to an inquiry received from the remote locator 10 and a microprocessor 18 configured to process transmitted and received data signals so as to extract information relating to the identification and location of a specific MT. For reliable and accurate operation of the RL10, a precision oscillator 20 is coupled to the microprocessor and is used to provide a very precise and stable frequency and clocking signal source. Transmission and reception of the coded signals is provided by way of antenna 15 that is coupled to transmitter 14 and receiver 16. In an example of the present invention, antenna 15 is a directional antenna adapted to identify the position of MT 12 relative to RL 10.

Display 22 provides visible and/or audio indicia of system performance and object location. A command and control unit 24 provides for entry of control data to the RL10 to initiate and terminate operation, as well as providing parameter change input capability. The unit 24 may also contain selectable stored signals which comprise unique identification codes embedded in random noise samples. The randomness of the noise samples significantly inhibits the ability to intercept and decode transmitted signals thus providing an important security advantage. The coded signal may also be embedded in noise naturally occurring in transmission. Such noise may come about by way of electrical power plant radiations, other communication signal interference, solar and atmospheric noise as mere examples. Power supply 26 may be of a conventional design to power RL10 during operation.

MT12 is preferably a very small self-contained unit configured to receive coded signals transmitted by RL10, and then examine the received signal to establish whether the RL10 is targeting such particular MT for interrogation. Accordingly, MT12 includes a receiver 28 adapted to receive coded signals from RL10, a transmitter 30 configured to transmit acknowledgement and data signals to RL10, a microprocessor 32 configured to analyze the received signals and provide an acknowledgment signal to be transmitted back to RL10. The MT12 further includes a precision oscillator 36 and a power supply 38 which may be a direct or rechargeable battery.

The physiologic sensor 34 includes monitoring sensors and associated circuitry adapted, for example, to monitor and/or measure the ambient temperature surrounding the MT, such temperature measurement capable of being transmitted to the RL receiver circuit 16. Other physiologic parameters contemplated being measured by the physiologic sensor 34 include, but are not limited to, heart rate, blood pressure, glucose level, and breathing rate information. Further, MT 12 may contain a motion detector, such as for example an accelerometer whereby signals indicative of the motion of the transponder may be transmitted back to the RL. Still further, MT 12 may include both a stimulation and sensing circuit (not shown) contained, for example, within sensor 34, that is adapted for electrically stimulating a nerve or muscle and for sensing an electrical signal associated with neuromuscular activity. Accordingly, if a coded received signal is successfully correlated with the MT identification code, the MT may provide either or both of an acknowledgement signal and/or a neuromuscular stimulation signal. The stimulation signal may be used to alert the bearer of the MT of the reception of a transmission from the RL which may have a pre-established intelligence aspect known to the bearer.

Still further the present invention contemplates a sound activated unit (not shown) contained for example in the sensor 34, adapted for recording received sound signals and configuring sound signals for transmission, where the sound transmission is effected through an information signal to the RL. In an example embodiment of the present invention, the information signal to the RL may be associated with the acknowledgement signal. Furthermore, the present invention contemplates a sound speaker associated with the MT so as to provide a sound or voice message to the bearer of the MT. The presentation of the sound or voice message may be made dependent upon correlation of the received coded signal and the MT identification code. In those cases where physiological, sound and sensory information is involved, it is to be understood that at least a mammal is involved as the object. Both the RL 10 and MT12, may be considered as communication devices since they interact with each other for communicating interrogation and acknowledgement signals between each other. Furthermore, the RL 10 may be considered a transceiver for its general transmitting and receiving capabilities. The microtransponder may also be considered and referred to as a transponder. In many regards, the RL 10 and MT 12 have similar, if not identical circuits, especially with regard to fast fourier transform and correlation capability. Accordingly, when describing a communication device herein, such description may be applicable to both the "remote locator" as well as the "transponder".

Figure 2:
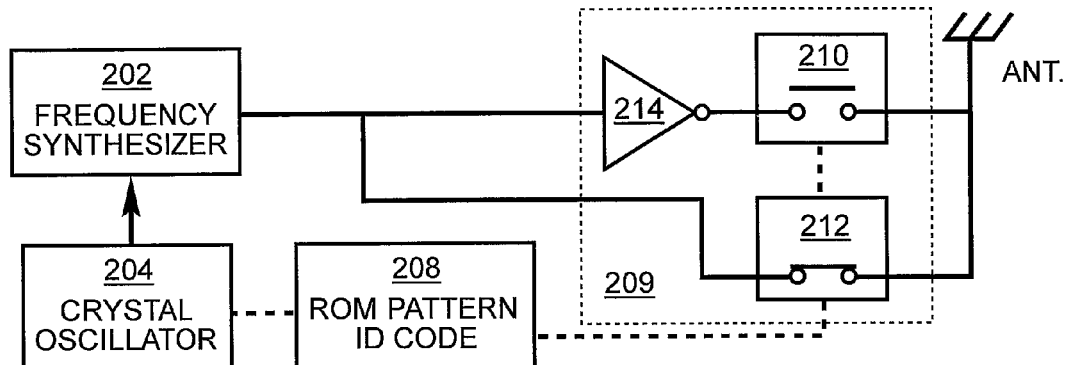
FIG. 2 is a block diagram of a transmitter circuit of the object locator of FIG. 1.

FIG. 2 is an illustration of a block diagram of particular details of the transmitter 14 of the RL 10 according to the present invention. The transmitter 14 comprises a frequency synthesizer 202 receiving a very accurate sinusoidal signal from crystal oscillator 204. Although the frequencies of choice from the crystal oscillator and frequency synthesizer are selectable, in one embodiment, it is contemplated that the frequency synthesizer 202 is a 400 MHz synthesizer and the associated crystal oscillator is a precision oscillator that is operable at 25 MHz. The frequency synthesizer 202 produces a carrier analog signal 206 at 400 MHz from the MHz precision oscillator 204. For the example system, the analog signal 206 is transmitted utilizing a Binary Phase Shift Keying (BPSK) modulation technique at an expected rate of 20 million chips per second. A chip per second represents a signaling time and controls the modulation of the carrier signal. Clock driven ROM 208 includes a stored pattern representative of a unique MT identification code that controls the rate of switching of a pair of switches 210 and 212. The unique MT identification code may be embedded in noise, typically as a result of transmission through the air, to significantly enhance resistance to interception and eavesdropping. Switches 210 and 212 provide phase shift keying and phase inversions of the carrier signal in accordance with the output of ROM 208. An inverter 214 provides the inverse of the analog signal 206 that is used for implementing the BPSK technique. Hence, an encoded signal is transmitted to MT 12 for identification. It should be noted again as discussed above, that the transmitted encoded signal is of a magnitude that is equal or below the general noise level in any particular communication channel. Hence, the encoded signal is practically undetectable to an eavesdropper searching for this encoded signal. Furthermore, the encoded signal contains the identification number of the intended MT 12.

Figure 3:
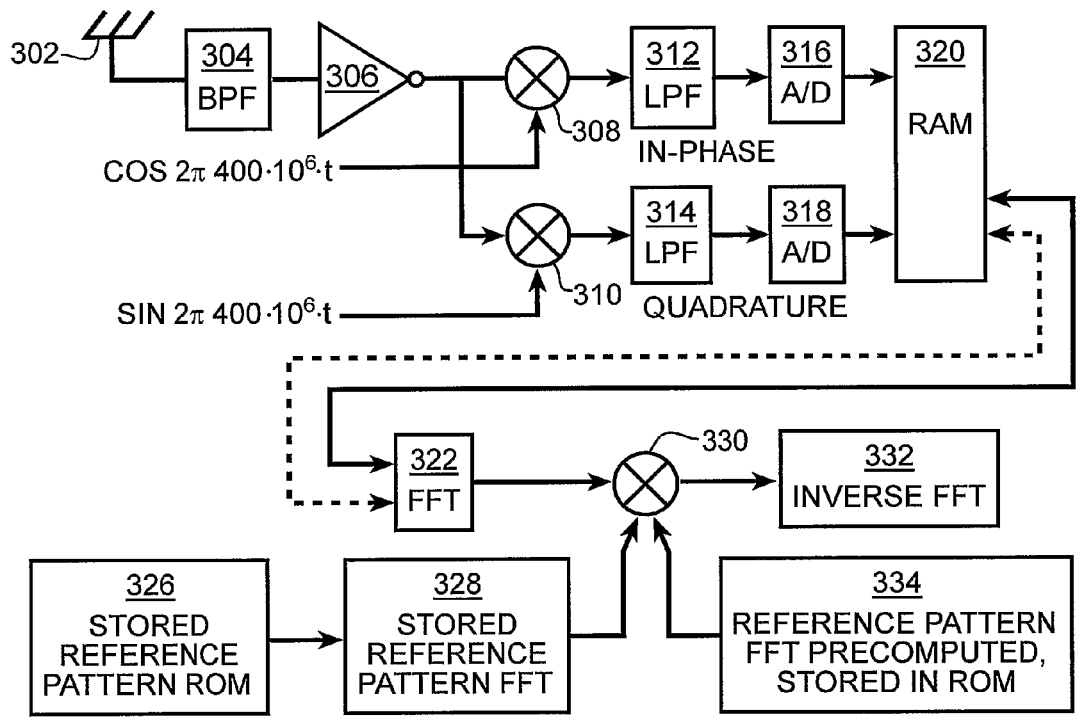
FIG. 3 is a block diagram of a receiver circuit of the object locator of FIG. 1.

FIG. 3 is an illustration of a block diagram of the details of receiver 28 of MT 12 according to the present invention. The interrogation signal transmitted by way of antenna 15 is received at receiver 28 by way of antenna 302, processed through band pass filter (BPF) 304 and amplified through preamp 306. A quadrature (I/Q) modulation technique is performed on the received encoded signal utilizing a set of appropriate mixers 308 and 310 coupled to low pass filters (LPF) 312 and 314 respectively. The outputs of mixers 308 and 310 provide an in-phase and quadrature phase modulated signal respectively. The LPF 312 and 314 are in turn coupled to Analog-to-Digital (A/D) converters 316 and 318 to provide a digital representation of the processed received encoded signal for further processing. In this example embodiment, the outputs of the A/D converters are provided to RAM 320 for later processing by a complex Fast Fourier Transform (FFT) operation. In one example of the present invention, the complex FFT operation transforms the digital signal stored in RAM 320 from a time-domain representation into a frequency-domain representation. It should be noted that in order for MT 12 to respond to RL 10, the unique identification number stored in and associated with the target MT 12 must be matched with the identification number transmitted by RL 10. Subsequent to further processing and upon a match of the identification number contained in the received encoded signal and the pre-existing identification number in MT 12, a relatively large "pulse signal" or "spike" will be extracted from the received encoded signal signifying the receipt of the target identification code.

Figure 4:
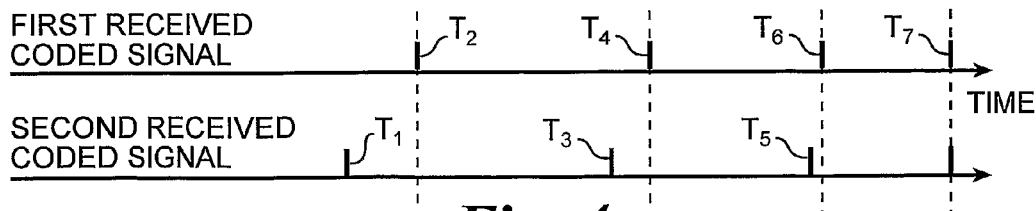
FIG. 4 is a timing diagram of received coded signals of the object locator of FIG. 1.

The aforementioned pre-existing identification number can be in the form of a pre-computed FFT of a stored reference pattern in ROM 334 or computed by an FFT operation on a stored reference pattern in ROM 326. It is contemplated that a typical complex FFT of the reference pattern results in about 4000 complex numbers that will be used for complex conjugate multiplication, on a "bin" by "bin" basis, against the same number of complex numbers generated by the complex FFT operation (discussed above) performed on the received (captured) encoded signal. As will be discussed later, the bins are arranged in succession order such that bin, is followed by $bin_2$ which is followed by $bin_3$ and so on. Each bin has a time duration such as, for example, 50 nanoseconds (ns). The inverse FFT of this multiplication product will effectively result in a correlation of the two complex numbers producing a relatively large pulse that is detectable by the internal circuitry of MT 12 signifying detection of a target identification code contained in an encoded transmission from RL 10. Although multiplication of 4000 complex numbers has been described, it is to be understood that a smaller or greater number of complex numbers and the corresponding number of bins is within the contemplation of the present invention Initially when MT 12 goes into a receive mode to receive communication from RL 10, it must be able to detect the beginning and the end of a frame of the encoded signal transmitted by RL 10 so that it can begin processing the encoded received signal from the beginning of the frame. This task is further complicated by the fact that RL 10 will be transmitting at irregular time periods for security purposes so that an eavesdropper would be much less likely to detect and interpret a repeating communication pattern that may be telling of an attempt to communicate with an intended MT. To resolve this complexity, it is contemplated that RL 10 will be transmitting signals at different commencement times, that is, one transmission "slides" in time relative to a prior transmission. Referring to FIG. 4, an exemplary illustration of the transmission of two such signals is presented. As shown, the second received coded signal "slides" closer to the first received coded signal in times of occurrence for each succeeding transmission such that the time difference between $T_6$ and $T_5$ is less than the time difference between $T_4$ and $T_3$ which is less than the time difference between $T_2$ and $T_1$ only at the last transmission of the coded first and second signals, that is at $T_7$, do they occur concurrently. By measuring the difference between the first and second signals at a later two points, the time within the interrogation sequence can be determined as well as the start of the first transmission.

In an example of the present invention, it is contemplated that RL 10 will be continuously transmitting the encoded signal, while MT 12 will be in receive mode for about 200 microseconds and then in the dormant (sleep) mode and/or processing mode for about 2 seconds. Furthermore, it is expected that the transmission time for the acknowledgment reply by MT 12 will be about 50 microseconds with transmission power being significantly less than for that of the RL 10. Therefore, the power consumption in MT 12 will be efficiently minimized such that MT 12 would be capable of operation for extended periods of time and potentially more than 10 years. The power supply/battery in MT 12 is a specialized long-lasting battery having about a 10-milli-amphour (mAH) capacity.

As discussed above, after a proper identification of the encoded signal by MT 12, MT 12 may wait a predetermined length of time before transmission of an acknowledgment to RT 10. Each MT utilized in the example of the invention, may include a predetermined time delay from the time it receives an encoded signal until the time of an acknowledgment transmission back to the RT 10. The predetermined time delay is long enough, generally about 2 milliseconds, to account for the totality of the receive time, processing time, and the wait time associated with each MT. In certain cases, the predetermined time delay may be set close to or equal to 0.0 seconds.

The transmitter 30 in MT 12 is similar in operation to transmitter 14 included in RL 10. Once the identification code has been recognized for a particular MT, then such MT, after a pre-selected delay time, if any, commences transmitting its own acknowledgement code or a related code, such as one associated with a physiological parameter (temperature, etc.) of the person carrying the MT, back to the RL 10. The RL 10 includes correlation circuitry and FFT processors similar to those contained in MT 12 and upon receipt of an acknowledgement signal from a MT processes the acknowledgement signal in a fashion similar to that undertaken in MT 12.

Upon detection of a large pulsatile signal from the inverse FFT process corresponding to the correlation of receipt of the acknowledgement signal from the targeted MT, a distance measurement is then performed in microprocessor 18, taking into account the time of transmission of the interrogation signal, the time of receipt of the acknowledgement signal and any pre-selected processing delays. By performing repeated distance measurements from several RL 10 sites, the location of MT 12 may be determined, as for example, a triangulation technique.

An interesting subtlety of the overall signal transmission, reception and processing method relates to the energy conservation consideration of the MT 12. Due to the limited energy delivery capacity of such a small device, attention is given to minimizing the "on" time of MT 12. For example, in a communication link between a satellite and a MT, where a continuous signal is transmitted by the satellite, MT 12 need only be in the "on" mode for relatively short period of time. If during the "on" time, a satellite transmitted signal is received, then a short period thereafter is allocated for interrogation of the received signal to determine whether the received signal correlates with one or more coded signal formats stored in the MT. If there is a match, then MT 12 will remain on to receive additional coded signals and then transmit back to the satellite an acknowledgement in any one of a number of formats. If there is no match, then MT 12 will go into a "sleep mode" for a relatively long period of time. For example, the "on" time may be set to 20 microseconds and interrogation (analyze) time set to 1 millisecond, and a sleep time set to 2 seconds. As a further subtlety, since the transmitted coded signal is somewhat repetitious, the signal received during the "on" time period may be processed to determine anticipated occurrence of the beginning of the next series of transmitted coded signals for receipt by the MT 12. Knowing such anticipated time will cause MT 12 to initially go into the sleep mode and then into the "on" mode just prior to the anticipated arrival of the next series of transmitted coded signals for receipt and processing. In this fashion, minimal energy expenditure will occur in MT 12.

A critical communication scheme taking into account the relatively large transmission power capacity of the satellite and the relatively low power transmission capacity of MT 12 relies on transmitting relatively high power short duration pulses from the satellite and the responsive relatively low power long duration pulses from MT 12. The FFT signal processing and extraction technique of the present invention provides the capability to implement such signal transmission strategy as described below with reference to FIGS. 5-8.

Figure 5:
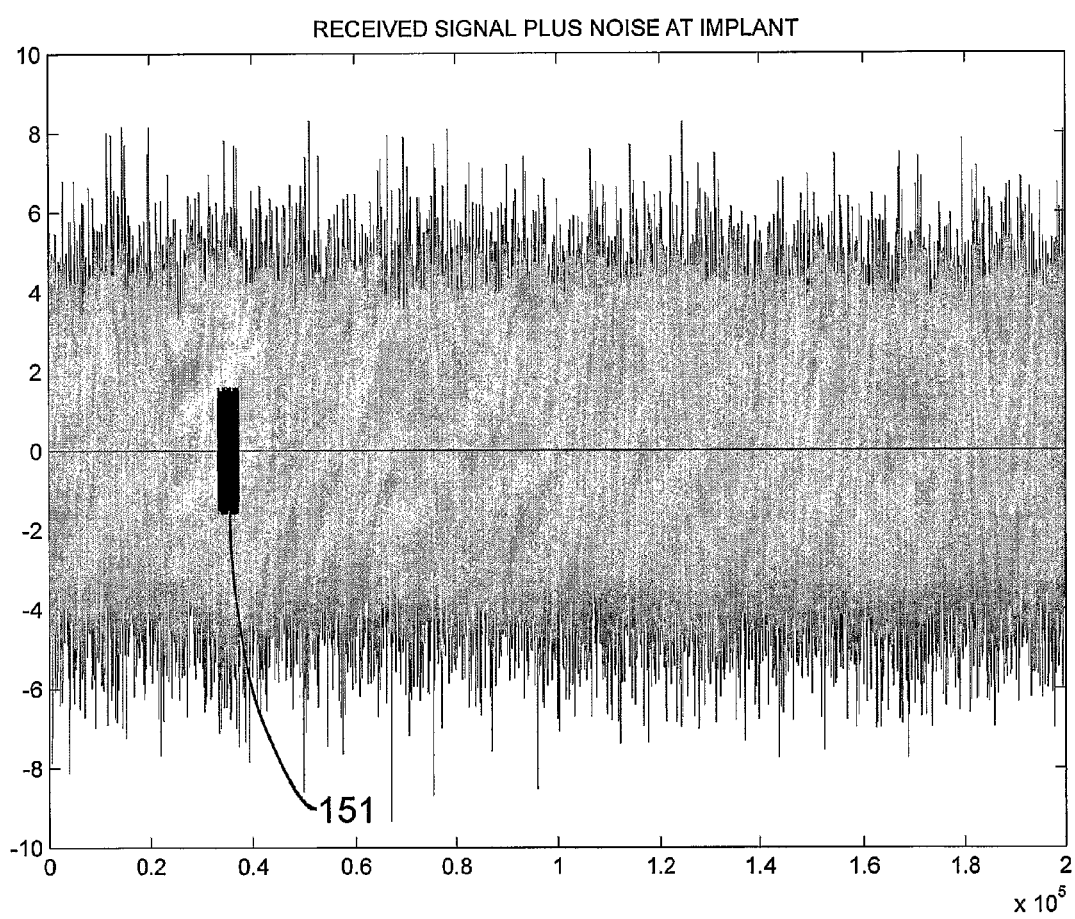
FIG. 5 is an illustration of transmitted signal from a remote locator received by a microtransponder.
Figure 6:
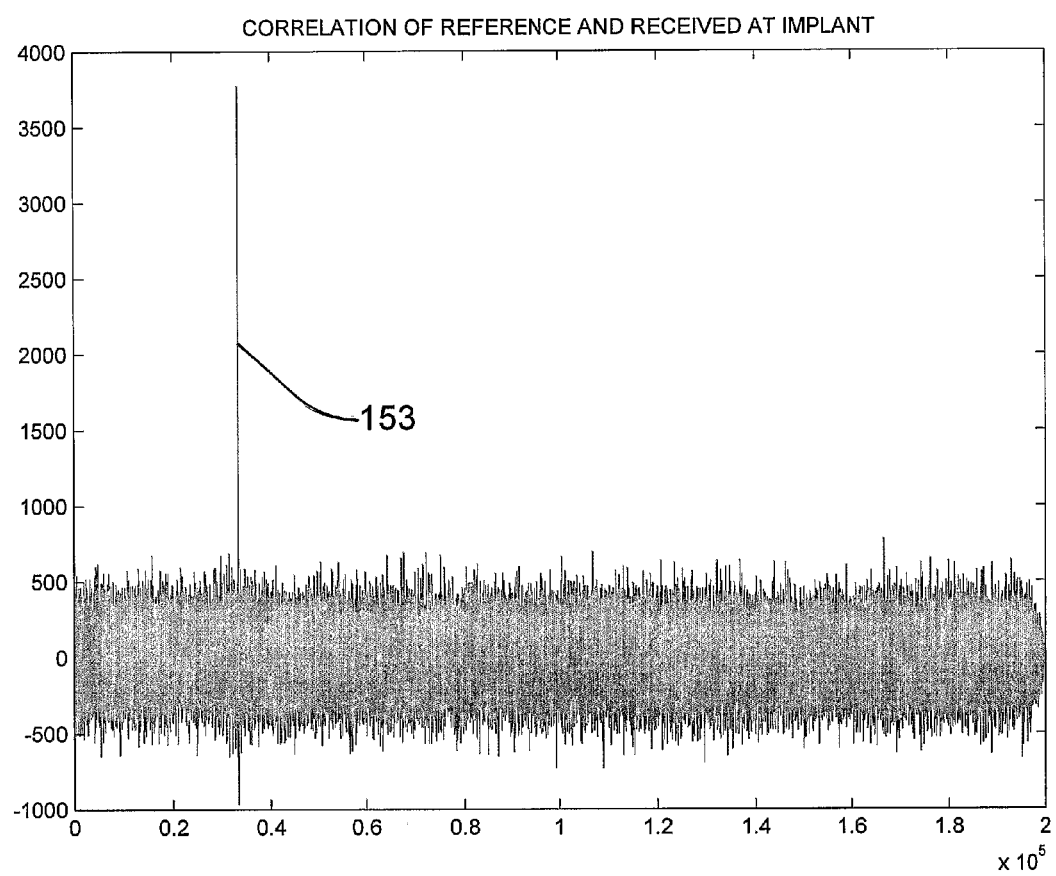
FIG. 6 is an illustration of the occurrence of the correlation between a coded transmitted signal from the remote locator and a coded signal associated with a microtransponder.
Figure 7:
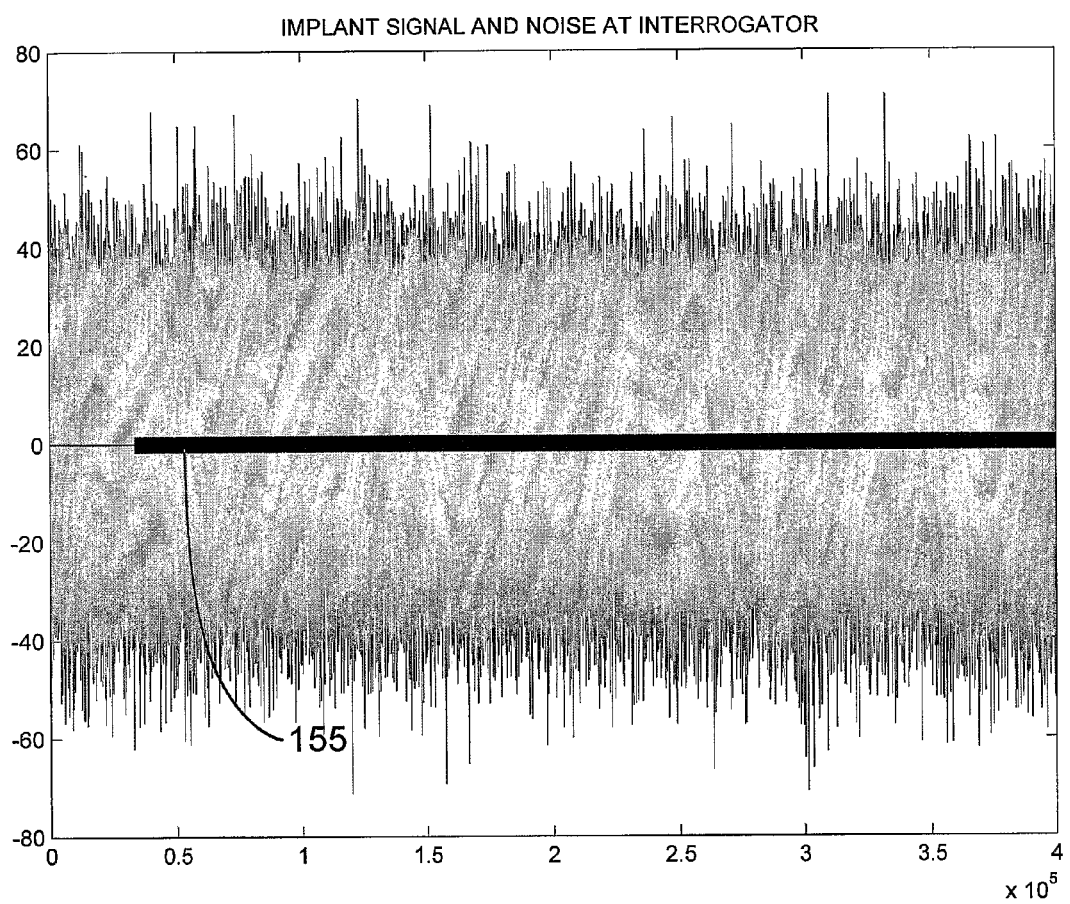
FIG. 7 is an illustration of an acknowledgement signal from a transponder received by a remote locator.
Figure 8A:
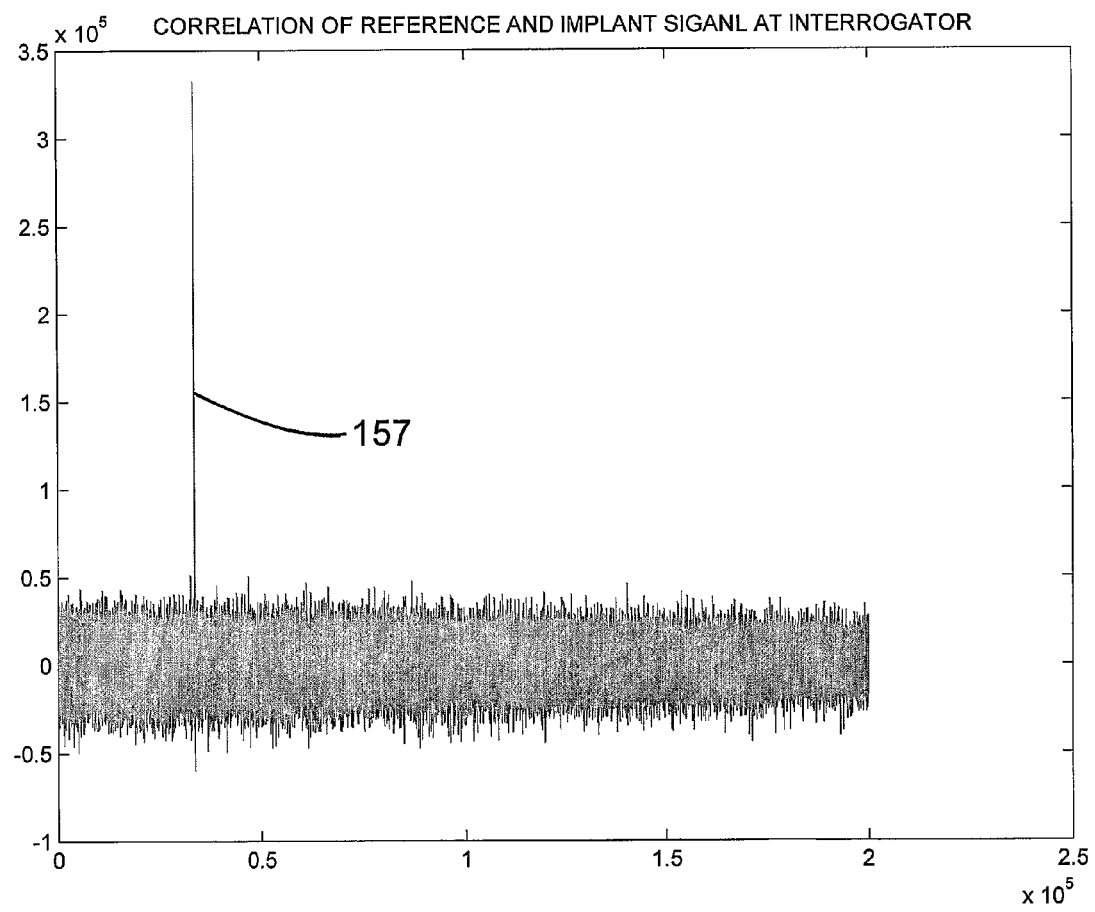
FIG. 8A is an illustration of the occurrence of the correlation between an acknowledgement signal received by a remote locator and a coded signal transmitted to a target microtransponder.
Figure 8B:
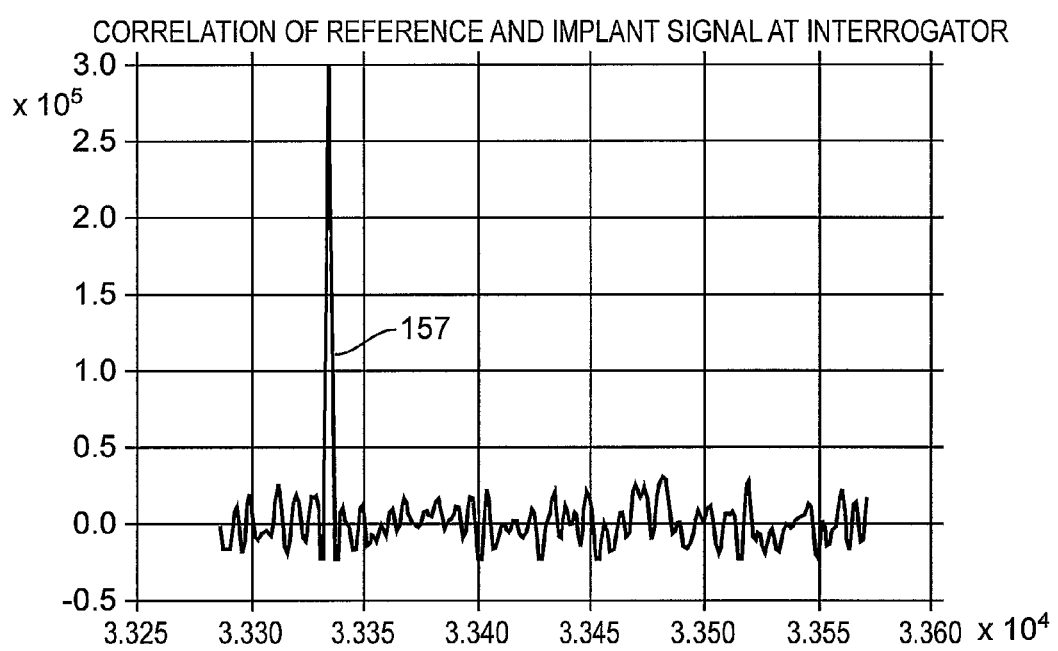
FIG. 8B is an exploded view of the occurrence of the correlation shown in FIG. 8A.

As a mere example and illustration of expected results for an sample case, a RL 10 (in this case a satellite) with an anticipated distance of 250,000 meters from an on earth target object, transmits an interrogation signal having a power level of 300 milli-watts. Further in the present example, MT 12 transmits an acknowledgement signal having a power level of 5 milli-watts, the carrier frequency is selected to be 380 megahertz, antenna gains are selected to be 0.0 dbi, bin duration is 50 ns and there are no processing time delays. FIG. 5 illustrates the transmitted interrogation pulse 151 [shown as a rectangular block] that is received by MT 12. As is illustrated, the transmitted signal is embedded in noise that can be attributed to a number of sources such as atmospheric noise, noise related to electronic and magnetic transmissions (television, radio, cell phone, wireless communication, power stations, etc.) and noise that may be deliberately added to the coded signal. As a result of the signal processing scheme undertaken in MT 12, the occurrence of a correlation between a coded transmitted signal and one of a plurality of stored coded signals in MT 12 is shown to occur by the existence of the large spike 153 relative to the other correlation (or lack of correlation) results shown in the pattern of FIG. 6. The acknowledgement signal (155) received by RL 10 that was transmitted by MT 12 in response to the occurrence of a match between the coded transmitted signal from RL 10 and a stored coded signal in MT 12 is shown in FIG. 7. As in the case of transmission of the interrogation signal from RL 10, the acknowledgement signal is also embedded in deliberately added or ambient noise from sources as previously discussed. RL 10 processes the received acknowledgement signal in essentially the same manner and fashion as does MT 12 with respect to the interrogation signal received from RL 10. The correlation of the acknowledgement signal from MT 12 with the interrogation signal from RL 10, confirming that MT 12 with targeted ID Code has responded, is shown in FIG. 8A, as evidenced by the large spike 157 relative to the remainder of the data shown. The bin number in which the spike 157 occurred is noted to be about 33,334 as shown on the abscissa of the exploded view of FIG. 8B. The round trip time from interrogation transmission to receipt of an acknowledgement is the product of the bin duration multiplied by the number of the bin at which correlation occurs in RL 10 or 50 ns×33, 334=1.6667 milli-seconds. The round trip distance is then calculated by dividing the round trip time by the speed of light or 1.6667 milli-seconds/3.3333 ns per meter=500,015 meters. The distance from RL 10 to MT 12 is therefore 250, 007 meters. In the event that a processing time or a predetermined delay is introduced in the overall signal processing method, then such time delay is subtracted from the round trip time to then provide a corrected round trip time. In the present example, such delay was set to 0.0 seconds.

The foregoing illustrates the efficacy of an example of the present invention. With the example parameters used, a location accuracy of within 7 meters in a distance of about 250, 000 meters is obtainable. Obviously as the data is further refined, any potential difference between actual and calculated distances will be further reduced. Utilizing the above example parameter values that are somewhat different than those otherwise discussed in the present description of the invention, illustrates the flexibility of the present invention. In the present invention, when the transmitted coded information, such as the transponder identification code, matches stored coded information such as the transponder identification code, then correlation or authentication has occurred. Thus the process of correlation may also be considered as authentication.

Figure 9:
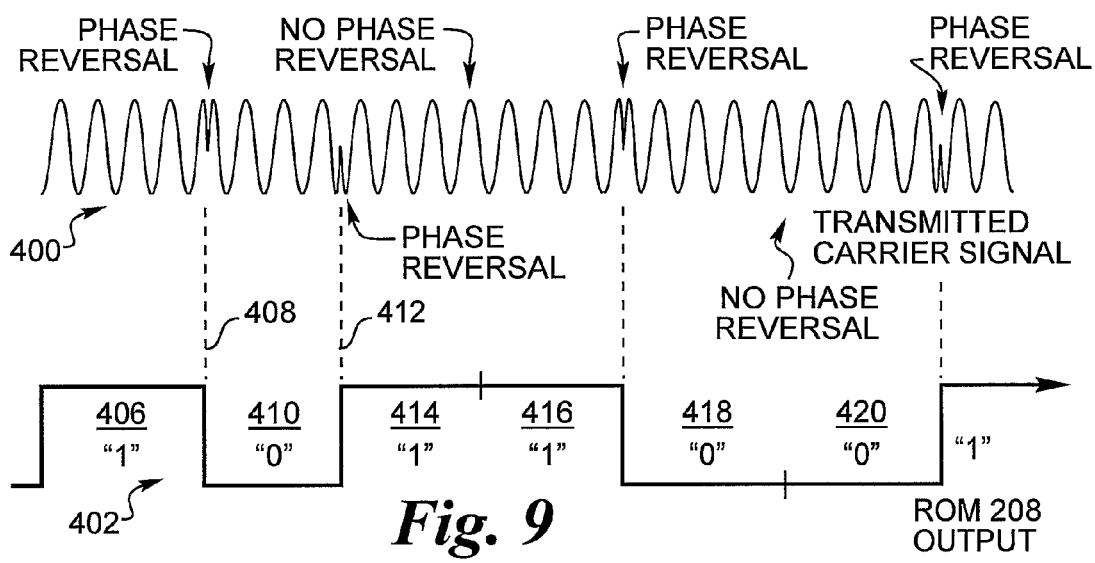
FIG. 9 is an illustration of transmitted carrier signal showing phase reversals.
Figure 10:
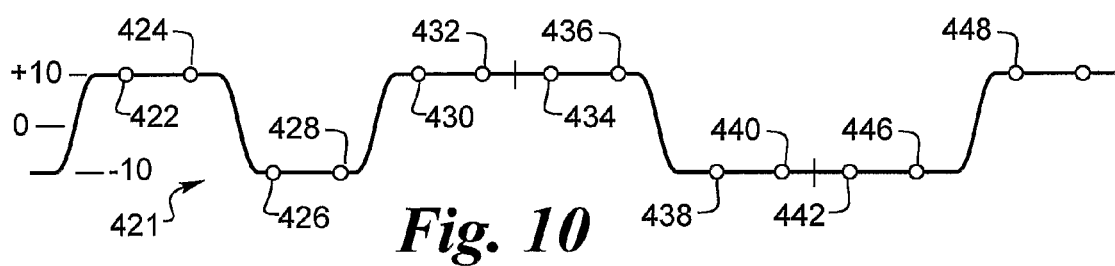
FIG. 10 is an illustration of the D.C. component of "mixed" signals at the output of LPF 312 of FIG. 3.

With reference to FIGS. 2, 9 and 10, a more detailed discussion of the nature of the modulated remote locator carrier signal is provided below. The 400-megahertz (MHZ) carrier provided by frequency synthesizer 202 has a period of 2.5 ns and with a transmission interval of 2 seconds being selected, then 800 million cycles or 800 megacycles of the carrier will occur. Frequency synthesizer 202 is driven by a very accurate crystal oscillator 204 accurate to one part in $10^{10}$ parts. The carrier is shifted 180 degrees in phase by means of utilizing inverter 214 located in binary phase shift keying (BPSK) block 209. As earlier described, a desired coded signal is stored in ROM 208 and clocked out of ROM 208 at a rate of 2 million chips/sec. The coded signal is in the form of a binary signal composed of ones "1" and zeros "0" and each "1" and "0" is defined as a chip. Accordingly, a chip delivery rate of 20 million chips per second translates into a chip period of 50 ns and therefore 20 cycles of the carrier occur within a 50 ns period of a chip. A coded word typically contains a desired number of chips sufficient to accurately define the coded signal. Coded words comprising 8 to 64 chips may be considered appropriate based upon the nature of the coded signal to be transmitted. The more complex the coded word the greater the number of chips required in order to maintain information transfer accuracy and fidelity.

As is recognized, the phase reversals of the carrier occur in block 209 in accordance with the state of the chips outputted from ROM 208. More specifically and with reference to FIG. 9, there is shown a transmitted carrier signal 400 whose phase reverses at the transition times of the chip (coded) signal 402. For purposes of illustration only, 7 bits (chips) of the coded information signal are shown. Moreover, for illustration purposes only, 4 cycles of the transmitted carrier rather than the 20 cycles previously identified per chip period are shown. During the time period 404, chip 406 is in the "1" state and the carrier signal is transmitted at a first phase typically, but not limited to, zero degrees. At the point 408 when the coded signal transitions from the "1" to the "0" state, the phase of the carrier signal reverses by 180 degrees and remains so for the duration of chip 410. Similarly, at the point 412 when a coded signal transitions from the "0" state to the "1" state, the phase of the carrier signal reverses back to zero degrees until another transition of the coded signal 402 occurs. It is to be noted that if no transition of state occurs in the coded signal, such as between chips 414 and 416, and chips 418 and 420, no phase change in the carrier occurs. It is important to note that in an embodiment of the present invention there is no requirement to have an integer number of carrier cycles occurring within each chip. Moreover, it is also important to note that multiple BPSK schemes can be used whereby phase changes of the carrier may be 90 degrees rather than 180 degrees.

As shown in FIG. 3, the transmitted coded signal received by MT antenna 302 is amplified by amplifier 306 and then supplied to multiplexer (mixers) 308 and 310. Mixer 308 produces the product of the amplifier received transmitted coded signal and a signal representing a cosine (cos) of the carrier signal to produce an "in phase" component. Mixer 310 produces the product of the amplified received transmitted coded signal and a signal representing the sine (sin) of the carrier signal to produce a "quadrature" component. It is recognized that the product of trigonometric functions as in the present case two sinusoidal varying signals, produces sinusoidal component frequencies equal to the sum and difference of the frequencies of each multiplicand. When the frequencies of the multiplicands are equal and in phase, the product of the multiplication generates a signal that has a direct current (DC) component and a sinusoidal component of twice the original frequency. The low pass filter LPF 312 will filter out the unwanted high frequency sinusoidal component and pass the DC component to the analog to digital converter (A/D) 316. The polarity of the DC component will change when the phase of the carrier signal reverses as previously described. Since the low pass filter 314 does not pass the high frequency components, no quadrature signal is passed to the A/D converter 318.

Both the in phase and quadrature phase signals however, will be present when the carrier signal is shifted in phase relative to the "mixer signals" $\sin(2\pi \cdot 400 \cdot 10^6 \cdot t)$ and $\cos(2\pi \cdot 400 \cdot 10^6 \cdot t)$. FIG. 10 represents the DC component 421 of the "mixed" signal appearing at the output of LPF 312. The polarity of the DC component 421 clearly tracks the polarity of the signal appearing at the output of ROM 208. The signal 421 is converted in A to D converter (A/D) 316. Each transmission of a coded signal is for a duration of about 100 microseconds. A sample time, which is the time between consecutive samples of signal 421, is 25 ns or a sampling rate of 40 MHz. As shown in FIG. 10, samples 422, 424, 426, 428 to the last sample shown 448 are spaced apart by 25 nanoseconds. Although FIG. 10 shows a continuous signal as 421, it should be understood that the sample points 422, 424, 426, 428, etc. are stored as individual complex numbers in RAM 320.

In another example of the present invention, at a sample rate of 40 MHz, 4000 samples are taken in a 100-microsecond interval and each sample is stored in a particular storage location or "bin" in RAM 320. The array of 4000 samples may be considered as a vector representation of the sampled signal. Each sample is contained in a 6-bit word which is stored in RAM 320. With zero quadrature components, each stored sample takes the form of a purely real number. However, if a quadrature component exists, then each stored sample has, in mathematical terms, a real component and an imaginary component in the form of $X+jY$ where X is the real component and Y is the imaginary component with the complex conjugate thereof in the form $X-jY$. The 4000-bin vector stored in RAM 320 is processed to generate a Fourier transform of the vector in FFT block 322. A discrete Fourier transform decomposes or separates a waveform or function into sinusoids of different frequency and magnitude which sum to the original waveform. It identifies different frequency sinusoids and their respective amplitudes. The transform provides a mathematical vehicle to represent a time domain signal in the frequency domain and vice versa. An enhancement to the discrete Fourier transform is known as a Fast Fourier Transform (FFT), which provides the same result, but with less mathematical processing and overhead. The FFT is a sophisticated method of undertaking the computations in a much faster time frame for a large number of samples. A pre-computed FFT of a stored reference pattern representing the identification code of a particular MT is held in read only memory (ROM) 334. Alternately, a stored reference pattern may be stored in ROM 326 and processed by FFT processor 328 to obtain a computed FFT of the identification code of a particular MT.

The vector representing the FFT of the stored reference pattern equals in length the vector stored in RAM 320. In the present case, the vector length relates to the 4000 samples stored in the corresponding 4000 bins. The FFT of the reference pattern is complex conjugate multiplied with the FFT of the stored captured pattern in mixer 330. An inverse FFT of the product is taken, which is a circular correlation of the captured signal and the selected reference signal. Since the FFT of the reference signal is determined from the unique identifier of a MT (e.g. ID Code), the output of the inverse FFT processor 332, will peak when a valid received code is identified in the captured signal. The multiplication proceeds on a bin-by-bin basis (see FIG. 11). That is, the contents of bin 1 of the computed vector is multiplied by the contents of bin 1 of the pre-computed vector and the product then stored in bin 1 of a product vector. The contents of bin 2 of the computed vector is multiplied by the contents of bin 2 of the pre-computed vector and the product then stored in bin 2 of a product vector and so on for each of the bins.

For example and more specifically, the FFT of the reference signal is provided as an array of N bins. The captured signal is calculated as an FFT, also of N bins. Next, the complex conjugate of each complex element in a designated storage bin ($BIN_1$-$BIN_N$) is multiplied by the data from the other corresponding storage bin. For example, the complex conjugate of the reference signal is stored in a first array (ARRAY 1) as ARRAY 1 [$BIN_1$-$BIN_N$], and the FFT of the captured signal is stored in a second array (ARRAY 2) as ARRAY 2 [$BIN_1$-$BIN_N$]. In another example, the FFT of the reference signal is stored in the first array (ARRAY 1) as ARRAY 1 [$BIN_1$-$BIN_N$], and the complex conjugate of the FFT of the captured signal is stored in a second array (ARRAY 2) as ARRAY 2 [$BIN_1$-$BIN_N$].

Figure 11:
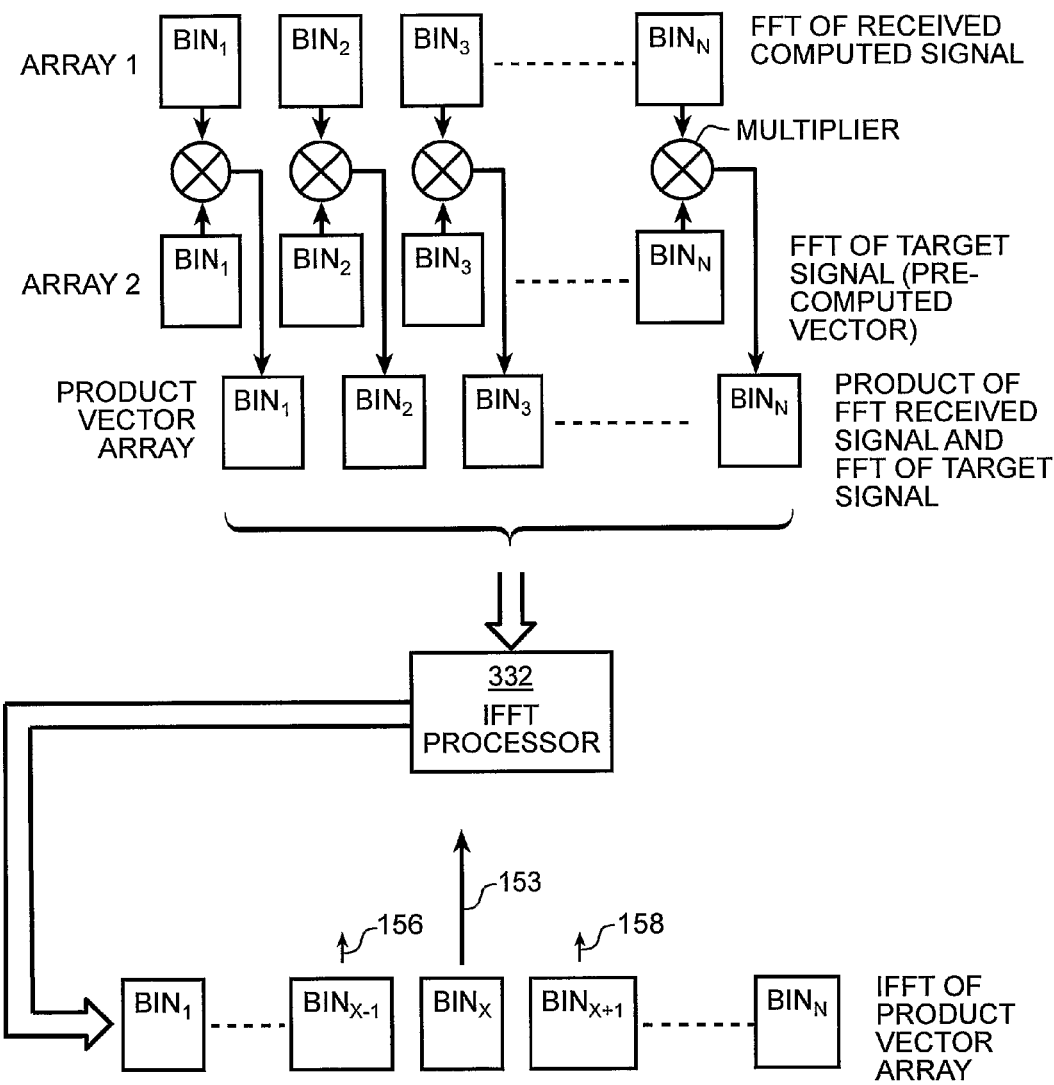
FIG. 11 is a block diagram representation of a complex conjugate frequency domain multiplication process and an inverse Fast Fourier Transform (FFT) process with an indication of a correlation.

The multipliers are arranged to receive data from the first array and the second array to provide a multiplied output, yielding a product result that can be stored in a third array (e.g. PRODUCT VECTOR ARRAY). An inverse FFT is computed in inverse FFT (IFFT) processor 332, from the product identified in the third array to retrieve the circular correlator output. The circular correlator output results may be stored either in a fourth array (not shown) or can overwrite the values in the third array, depending upon implementation. As shown in FIG. 11, the inverse FFT of the circular correlator output has a peak magnitude 153 that occurs when the FFT of the reference signal and the captured signal correlate with each other. The number of the bin in which the peak occurred and the time allocated for each bin, can eventually be used to measure distance between the RL and the MT.

The time allocation for each bin in the present sample case is 50 ns, thus if a match occurs, that is, an incoming coded signal matches the pre-computed stored reference pattern, the time of occurrence of a match which is related to the time when sampling commenced, may be determined by counting the number of bins up to the occurrence of the match. A match will be identified by a unitary spike (153) occurring in the graphed vector produced by the inverse FFT as shown in FIG. 6. Additional spikes 156 and 158 may occur on either side of spike 153 due to the nature of the inverse FFT processing. Although a spike appears in FIG. 6 as a single line, it does so because of the scaling of the abscissa of FIG. 6. Actually the spike may be in the form of a very narrow "bell" shaped curve. This occurs because the FFT of the vector representing the received coded and processed signal and the pre-computed FFT of the references pattern [identification code] increases in magnitude rapidly in the region of the "fundamental" frequencies defining the processed received coded signal and the pre-computed FFT of the reference pattern. The occurrence of the spike causes MT 12 to transmit an acknowledgement signal in the same fashion and technique as shown in FIG. 2. To conserve power in the MT 12, transmission of the acknowledgement signal may be at a reduced power level but for a longer interval of time, as for example, an order of magnitude longer than the transmission time of the RL. The RL 10 will have the processing regime arranged to accommodate the longer signal transmission times of the particular MT 12.

Upon receiving the acknowledgement signal, RL 10 undertakes the signal processing regime in essentially the same manner with essentially the same system components and methods as described for MT 12. Accordingly, RL 10 includes circuitry consistent with that shown in FIG. 3 and processes the acknowledgement signal in a manner similar to that as was described in detail for MT 12. The microprocessor 18 maintains the stored values of when transmission of the coded signal commenced [$T_O$], the time sampling commenced [$T_S$], the bin number having the maximum value of the spike [$BIN_x$] as well as a pre-selected delay time, if any, assigned for signal processing [$T_D$], if any. The time $T_B$ at which the spike occurred equals the bin number in which the spike occurred multiplied by the time duration per bin, as for one of the cases described, 25 ns or $T_B$=(25 ns/BIN)·$BIN_x$ As described, the round trip or echo time [ET], which is the time from coded signal transmission to acknowledgement recognition, is a measure of the distance between RL 10 and MT 12. The corrected echo time [CET] is the echo time minus the processing time $T_D$. Accordingly, the distance D between RL 10 and a MT 12 is given by the equation: $D=\frac{1}{2} \cdot C [(T_S + T_B - T_O) - T_D]$, where $T_O$=0 for a normalized calculation and C=speed of light.

Although the preceding description describes various embodiments of the system, the invention is not limited to such embodiments, but rather covers all modifications, alternatives, and equivalents that fall within the spirit and scope of the invention. Since many embodiments of the invention can be made without departing from the spirit and scope of the invention, the invention resides in the claims hereinafter appended.

What is claimed is:

1. A method for locating a transponder (MT) with a remote locator (RL), the method comprising:
    selecting an identification code (ID Code) for transmission from the RL to at least one MT, wherein each of the at least one MT has a specific associated ID Code;
    generating, at a predetermined carrier frequency, a transmission signal for transmission by the RL, the transmission signal comprising: a first pattern that is transmitted over a first transmission interval, wherein the selected ID Code is encoded within the first pattern;
    transmitting the transmission signal from the RL for reception by the MT at a first time;
    receiving the transmission signal from the RL by the MT to provide a received signal;
    correlating, by FFT processing at the predetermined carrier frequency, the received signal with an ID Code stored in the MT to detect the presence of the selected ID Code in the received signal;
    upon detection of the selected ID Code in the received signal, generating an acknowledgement signal;
    transmitting the acknowledgement signal, at the predetermined carrier frequency, from the MT to the RL; said selected ID Code being encoded in the acknowledgement signal;
    receiving the acknowledgement signal from the MT by the RL at a second time;
    correlating, by FFT processing at the predetermined carrier frequency, the received acknowledgement signal with the selected ID Code stored in the RL to detect the presence of the selected ID Code in the acknowledgement signal; and
    upon detection of said selected ID Code in the acknowledgement signal, determining a distance between the RL and the MT as a function of an elapsed time between the first time and the second time.

2. The method of claim 1, wherein the step of generating a transmission signal further comprises:
    providing a carrier; and
    modulating the carrier as a function of the selected ID Code to thereby generate the transmission signal.

3. The method of claim 2, wherein the modulating step comprises the step of modulating the carrier by the selected ID Code by utilizing at least one of: a multi-phase shift keying (MPSK) pattern, a binary-phase shift keying (BPSK) pattern, and a quadrature phase shift keying (QPSK) pattern.

4. The method of claim 1, wherein transmitting the transmission signal from the RL to the MT comprises: transmitting the transmission signal by the RL at a first power level during a first time period; and wherein transmitting the acknowledgement signal from the MT to the RL comprises transmitting the acknowledgement signal at a second power level during a second time period.

5. The method of claim 4, wherein the first power level is at least an order of magnitude greater than the second power level.

6. The method of claim 4, wherein the second time period is at least one order of magnitude greater than the first time period.

7. The method of claim 1, wherein the step of correlating the received signal further comprises the step of processing the received signal from the RL to provide an in phase signal and a quadrature phase signal.

8. The method of claim 7, wherein the step of processing the received signal further comprises the step of mixing the received signal from the RL with a first sinusoidal signal at the carrier frequency, said first sinusoidal signal having a first phase angle to thereby provide an in phase product and mixing the received signal from the RL with a second sinusoidal signal at the carrier frequency, said second sinusoidal signal having a second phase angle 90 degrees shifted with respect to the first phase angle to thereby provide a quadrature phase product.

9. The method of claim 8, further comprising the step of analog to digital conversion of the in phase product and the quadrature phase product to provide a digital representation of each product and further storing each product in a memory.

10. The method of claim 9, further comprising the step of generating a Fast Fourier Transform (FFT) of each product stored in the memory.

11. The method of claim 10, further comprising the step of complex conjugate multiplying the FFT of each product with either of: (1) a pre-computed FFT of an ID Code associated with an MT or (2) the FFT of an ID Code of an MT and providing thereby a vector representing such multiplication.

12. The method of claim 11, further comprising the step of generating the inverse FFT of said vector, wherein the existence of a large spike occurring within the inverse FFT relative to other spikes therein, indicates a match between the ID Code in the received transmission signal from the RL and the ID Code of the MT.

13. The method of claim 12, further comprising the step of transmitting an acknowledgement signal from the MT to the RL subsequent to detecting the existence of a match between the ID Code in the received transmission signal from the RL and the ID Code of the MT.

14. The method of claim 13, wherein the steps of: generating a Fast Fourier Transform (FFT) of each product stored in the memory; complex conjugate multiplying the FFT of each product with either of: (1) a pre-computed FFT of an ID Code associated with an MT or (2) the FFT of an ID Code of an MT and providing thereby a vector representing such multiplication, is undertaken on a bin by bin basis.

15. The method of claim 13, further comprising the step of receiving the transmitted acknowledgement signal by the RL.

16. The method of claim 15, further comprising the step of correlating the received acknowledgement signal with the ID Code of the target MT stored in the RL.

17. The method of claim 7, wherein the step of correlating the received acknowledgement signal by the RL further comprises the step of mixing the received acknowledgement signal from the MT with a first sinusoidal signal at the carrier frequency, said first sinusoidal signal having a first phase angle to thereby provide an in phase product and mixing the received acknowledgement signal from the MT with a second sinusoidal signal at the carrier frequency, said second sinusoidal signal having a second phase angle 90 degrees shifted with respect to the first phase angle to thereby provide a quadrature phase product.

18. The method of claim 17, further comprising the step of analog to digital conversion of the in phase product and the quadrature phase product related to the received acknowledgement signal to provide a digital representation of each product and further storing each product in a memory.

19. The method of claim 18, further comprising the step of generating a Fast Fourier Transform (FFT) of each product related to the received acknowledgement signal stored in the memory.

20. The method of claim 19, further comprising the step of complex conjugate multiplying the FFT of each product related to the received acknowledgement signal with either of: (1) a pre-computed FFT of an ID Code associated with the target MT or (2) the FFT of an ID Code of the target MT and providing thereby a vector representing such multiplication.

21. The method of claim 20, further comprising the step of generating the inverse FFT of said vector relating to the received acknowledgement signal, wherein the existence of a large spike occurring within the inverse FFT relative to other spikes therein, indicates a match between the ID Code in the received acknowledgement signal from the MT and the ID Code of the MT stored in the RL.

22. The method of claim 21, wherein the steps of: generating a Fast Fourier Transform (FFT) of each product stored in the memory; complex conjugate multiplying the FFT of each product with either of: (1) a pre-computed FFT of an ID Code associated with an MT or (2) the FFT of an ID Code of an MT and providing thereby a vector representing such multiplication, is undertaken on a bin by bin basis, the bins arranged in succession order, each bin having a bin number related to the position of such bin in the succession.

23. The method of claim 22, wherein the bins have a predetermined time duration, the method further comprising the steps of:
   identifying the bin in which the large spike occurs;
   identifying the bin number of the bin in which the spike occurs;
   multiplying the bin number by the predetermined bin time duration to provide a round trip time;
   subtracting a predetermined time delay, if any, from the round trip time to provide a corrected round trip time;
   multiplying the corrected round trip time by the speed of light to thereby determine the round trip distance; and
   dividing the round trip distance by two to thereby determine the distance between the RL and the MT.

24. The method of claim 23, further comprising the step of providing a directional antenna for use in conjunction with the RL to determine the position of the MT relative to the RL.

25. The method of claim 23, wherein the predetermined time delay is 0.0 seconds.

26. The method of claim 1, further comprising the step of providing a MT having a lateral dimension of no greater than about 7 mm and a longitudinal dimension of no greater than about 70 mm.

27. The method of claim 1, further comprising the step of providing a MT having a volume of no greater than about 2700 $mm^3$.

28. An object locator system configured for operation utilizing FFT processing at a predetermined carrier frequency, the system comprising:
   a microtransponder (MT) for use in association with the object to be located and responsive to a received coded signal comprising:
   a MT receiver circuit adapted to recognize the received coded signal when it correlates with an identification code (ID Code) associated with such MT and trigger a response thereto, said MT receiver circuit including means to correlate the received coded signal with the ID Code of such MT by the use of FFT processing at the predetermined carrier frequency;
   a transmitter circuit adapted to transmit at the predetermined carrier frequency an acknowledgment signal after detection of the triggered response; and
   a remote locator (RL) for determining the distance between the RL and said object comprising:
   a RL transmitter adapted to transmit at the predetermined carrier frequency a coded signal for transmission to the MT;
   a RL receiver circuit adapted to receive the acknowledgement signal; and
   a time measurement circuit adapted to measure the round trip time between the transmission of the coded signal by the RL and receipt of the acknowledgment signal, whereby the distance between the MT and RL is a function of the time between the transmission of the coded signal and receipt of the acknowledgment signal.

29. The object locator system of claim 28, wherein the RL transmitter circuit comprises:
   a carrier frequency signal generator adapted to generate a carrier frequency signal at the predetermined frequency;
   a storage device adapted to store a coded signal associated with a MT, the storage device having an output providing a data pattern representing the coded signal; and
   a modulator circuit coupled to the output of the storage device and the carrier frequency signal generator and adapted to provide a coded output signal representing the carrier frequency signal being modulated in accordance with said data pattern.

30. The object locator system of claim 29, wherein the modulating circuit is adapted to perform at least one of: multi-phase shift keying (MPSK), binary-phase shift keying (BPSK), and a quadrature phase shift keying (QPSK).

31. The object locator system of claim 29, wherein the MT receiver circuit is adapted to process a received coded signal to provide two output signals in quadrature phase relationship comprising an in phase signal and a quadrature phase signal.

32. The object locator system of claim 31, wherein the MT circuit receiver further comprises:

an analog to digital (A/D) converter adapted to provide a digital representation of the in phase signal and the quadrature phase signal;

a random access memory adapted to store the digital representation of the in phase signal and the quadrature phase signal;

a Fast Fourier Transform (FFT) circuit coupled to the random access memory and adapted to generate a FFT of the digital representation of the in phase signal and the quadrature phase signal;

a multiplier circuit adapted to complex conjugate multiply the FFT of the digital representation of the in phase signal and the quadrature phase signal with a pre-computed FFT associated with an ID Code relating to a target MT or the FFT of an ID Code associated with a target MT, the multiplication providing thereby a resultant multiplication vector; and an inverse FFT circuit adapted to transform said resultant multiplication vector, wherein the existence of a large pulsatile signal relative to other pulsatile signals within the transformed vector indicates a match between the received coded signal and the ID Code associated with the target MT.

33. The object locator system of claim 32, wherein the MT transmitter circuit is adapted to transmit an acknowledgement signal upon the detection of the existence of a large pulsatile signal relative to other pulsatile signals within the transformed vector.

34. The object locator system of claim 33, wherein the MT transmitter circuit comprises:

a carrier signal generator adapted to generate a carrier signal at the predetermined frequency;

a storage device adapted to store a coded signal associated with the MT, the storage device having an output providing a data pattern representing the coded signal; and a MT modulator circuit coupled to the output of the storage device and the carrier signal generator and adapted to provide a coded output signal representing the carrier signal being modulated in accordance with said data pattern.

35. The object locator system of claim 34, wherein the MT modulating circuit is adapted to perform at least one of: multi-phase shift keying (MPSK), binary-phase shift keying (BPSK), and a quadrature phase shift keying (QPSK).

36. The object locator system of claim 34, wherein the RL receiver circuit is adapted to process a received coded signal to provide two output signals in quadrature phase relationship comprising an in phase signal and a quadrature phase signal.

37. The object locator system of claim 36, wherein the RL receiver circuit further comprises:

an analog to digital (A/D) converter adapted to provide a digital representation of the in phase signal and the quadrature phase signal;

a random access memory adapted to store the digital representation of the in phase signal and the quadrature phase signal;

a Fast Fourier Transform (FFT) circuit coupled to the random access memory and adapted to generate a FFT of the digital representation of the in phase signal and the quadrature phase signal;

a multiplier circuit adapted to complex conjugate multiply the FFT of the digital representation of the in phase signal and the quadrature phase signal with a pre-computed FFT associated with an ID Code relating to a target MT or the FFT of an ID Code associated with a target MT, the multiplication providing thereby a resultant multiplication vector, said multiplication being undertaken on a bin by bin basis, the bins arranged in succession order, each bin having a bin number related to the position of such bin in the succession; and an inverse FFT circuit adapted to transform said resultant multiplication vector, wherein the existence of a large pulsatile signal relative to other pulsatile signals within the transformed vector indicates a match between the received coded signal and the ID Code associated with the target MT, the bins arranged in succession order, each bin having a bin number related to the position of such bin in the succession.

38. The object locator system of claim 37, wherein the time measurement circuit further comprises circuitry adapted to:

identifying the bin in which the large spike occurs;

identifying the bin number of the bin in which the spike occurs;

multiplying the bin number by a predetermined bin time duration to provide a round trip time;

subtracting a predetermined time delay, if any, from the round trip time to provide a corrected round trip time;

multiplying the corrected round trip time by the speed of light to thereby determine the round trip distance; and dividing the round trip distance by two to thereby determine the distance between the RL and the MT.

39. The object locator system of claim 28, wherein the MT is sized to have a lateral dimension of no greater than about 7 mm and a longitudinal dimension of no greater than about 70 mm.

40. The object locator system of claim 28, wherein the MT is sized to have a volume of no greater than about 2700 mm$^3$.

41. The object locator system of claim 28, wherein the MT includes at least one physiologic sensor adapted for monitoring selected physiological parameters and wherein the MT transmitter is adapted to transmit signals corresponding to such physiological sensors to the RL.

42. The object locator system of claim 41, wherein said physiological parameters comprise at least one of: surrounding ambient temperature; heart rate; blood pressure; glucose level; and breathing rate.

43. The object locator system of claim 28, wherein the MT further comprises a motion detector and wherein the MT is adapted to transmit movement information associated with the MT to the RL.

44. The object locator system of claim 43, wherein the motion detector comprises an accelerometer.

45. The object locator system of claim 28, wherein the MT comprises stimulation circuitry for stimulating a nerve or muscle in an object in response to a correlated received coded signal.

46. The object locator system of claim 28, wherein the MT further comprises sensing circuitry for sensing an electrical signal associated with neuromuscular activity in said object, wherein said electrical signal is transmitted to the remote locator.

47. The object locator system of claim 28, wherein the MT further comprises a sound-activated unit for receiving and/or recording and/or transmitting sound, wherein the sound transmission is effected through an information signal used in association with the acknowledgement signal to the RL.

48. The object locator system of claim 47, further comprising a speaker associated with the MT for providing an audio message to the object from the RL.

49. The object locator system of claim 28, wherein the RL receiver circuit further comprises an antenna configured to transmit and receive radio waves.

50. The object locator system of claim 49, wherein the RL receiver antenna comprises a directional antenna adapted to identify the position of the MT relative to the RL.

51. The object locator system of claim 28, wherein the RL includes circuitry to transmit a plurality of signals being coded to match different ones of a plurality of objects, wherein an acknowledgement signal is transmitted by an MT when a received coded signal matches the ID Code associated with such MT.

52. The object locator system of claim 28, wherein the RL further comprises a global positioning system (GPS) circuit, including a GPS signal antenna, adapted to receive global positioning satellite (GPS) signals and obtain thereby the current MT position, the MT configured to transmit such current MT position to the remote locator.

53. An object locator system, comprising:
at least one location transceiver adapted to be connected to or implanted in an object to be located, wherein the location transceiver comprises a broadband receiver and a low power broadband encoded signal transmitter; and
a finder transceiver for communicating with the location transceiver, wherein the finder transceiver comprises a high power broadband encoded transmitter and a broadband receiver;
wherein the location transceiver periodically operates in a receive mode for a first predetermined length of time and in a sleep mode for a second predetermined period of time; and
wherein the finder transmitter periodically transmits a relatively high power encoded signal for a third predetermined length of time, wherein the third predetermined length of time is at least as long as the first predetermined length of time.

54. The system of claim 53, wherein the high power encoded signal comprises at least one identification (ID) code associated with the location transceiver.

55. The system of claim 54, wherein in response to reception of the at least one ID code from the finder transceiver, the location transceiver provides an encoded signal comprising appropriate acknowledgement information for the finder transceiver when the received ID code matches that associated with the location transceiver.

56. The system of claim 55, wherein upon reception of all or part of the finder transceiver transmitted signal, said location transceiver schedules operation in the receive mode during transmission of the encoded signal by the finder transceiver so as to capture at least one complete encoded signal containing the ID code.

57. The system of claim 55, wherein the finder transceiver transmitted signal is transmitted in a series of repeating intervals wherein the signal received by the location transceiver during the receive mode, is used by the location transceiver to determine the anticipated occurrence of a following series of repeating intervals.

58. The system of claim 57, wherein the location transceiver includes circuitry to determine the anticipated occurrence of a following series of repeating intervals, to cause the location transceiver to go into a sleep mode and then into the receive mode prior to the anticipated arrival of a following series of repeating intervals.

59. The system of claim 53, wherein the location transceiver is sized to have a lateral dimension of no greater than about 7 mm and a longitudinal dimension of no greater than about 70 mm.

60. The system of claim 53 wherein the location transceiver is sized to have a volume of no greater than about 2700 $mm^3$.

61. A method for locating a transponder with a transceiver, the method comprising:
selecting an identification code (ID Code) stored in the transceiver, for transmission from the transceiver to at least one transponder, wherein each of the at least one transponder has a specific associated ID Code;
generating a transmission signal at a predetermined carrier frequency for transmission by the transceiver, wherein the transmission signal includes the selected ID Code;
transmitting the transmission signal from the transceiver for reception by the transponder at a first time;
receiving the transmission signal from the transceiver by the transponder to provide a received signal;
correlating, utilizing Fast Fourier Transform processing at the predetermined carrier frequency to correlate in the time domain, the received signal with an ID Code stored in the transponder to detect the presence of the selected ID Code in the received signal;
upon detection of the selected ID Code, generating an acknowledgement signal by the transponder;
transmitting the acknowledgement signal from the transponder to the transceiver;
receiving the acknowledgement signal from the transponder by the transceiver at a second time; and
determining a distance between the transceiver and the transponder as a function of an elapsed time between the first time and the second time.

62. The method of claim 61, wherein the step of receiving the acknowledgement signal by the transceiver includes correlating, utilizing Fast Fourier Transform processing at the predetermined carrier frequency, the acknowledgement signal with the ID Code stored in the transceiver to detect the presence of the selected ID Code in the acknowledgement signal.

63. The method of claim 62, wherein the steps of correlating further includes correlating utilizing inverse Fast Fourier Transforms.

* * * * *